United States Patent

Macone et al.

[15] 3,687,273
[45] Aug. 29, 1972

[54] TRANSPORT BELT ALIGNMENT SYSTEM

[72] Inventors: Frederick W. Macone, Carlisle; Normand Lafortune, Dracut, both of Mass.

[73] Assignee: Avant Incorporated, Concord, Mass.

[22] Filed: Nov. 5, 1970

[21] Appl. No.: 87,277

[52] U.S. Cl. ................................................198/202
[51] Int. Cl. ................................................B65g 15/62
[58] Field of Search ............198/202; 226/15, 17, 16

[56] References Cited

UNITED STATES PATENTS

| | | | |
|---|---|---|---|
| 2,725,757 | 12/1955 | Murphy | 198/202 |
| 2,783,871 | 3/1957 | Sowards | 198/202 |
| 3,545,599 | 3/1968 | Smith | 198/202 |

*Primary Examiner*—Richard E. Aegerter
*Attorney*—Robert L. Nathans

[57] ABSTRACT

This disclosure illustrates an inexpensive and reliable mechanical system for maintaining an endless transport belt in alignment with its direction of travel. A pair of sensing levers having mechanical belt position sensors in contact with opposite edges of the belt is provided for sensing a shift in the belt position along the longitudinal axis of a belt support roller. As the belt commences to shift, one of the sensing levers is actuated to apply a mechanically magnified torque to a roller adjusting lever coupled thereto, which torque is again magnified and applied in turn to the roller in a direction to induce increased tensile stress in the belt to cause the belt to become realigned with respect to its direction of motion.

19 Claims, 5 Drawing Figures

FREDERICK W. MACONE
NORMAND LaFORTUNE
INVENTORS.

BY Robert L. Mathews
ATTORNEY

FREDERICK W. MACONE
NORMAND LaFORTUNE
INVENTORS.

BY
Robert L. Nathans
ATTORNEY.

3,687,273

TRANSPORT BELT ALIGNMENT SYSTEM

BACKGROUND OF THE INVENTION

This invention relates to the field of transport belt alignment systems.

Transport systems often employ one or more endless belts which are driven or supported by a pair of separated rollers and which are utilized to convey articles along the direction of motion of the belt.

One of the problems in these systems is caused by the endless belt shifting or creeping along the longitudinal axis of one of the rollers which in turn causes misalignment and often belt breakage. In belts which have a degree of elasticity, crowned pullies have been utilized to help alleviate this problem. However, this approach simply will not work for relatively non-stretchable, endless belts.

Another approach to the foregoing problem involves the use of elaborate and expensive electromechanical servo systems for sensing belt creep and for applying compensation forces to the rollers to tilt their axes of rotation in a direction to correct the creepage. For example, a photoelectric belt edge sensor can be utilized to feed signals indicative of belt shift to a motor control circuit which in turn is coupled to a servo motor which applies the correction torque to the roller to correct such creepage. These systems are relatively complex and expensive and are not economical for use where an inexpensive endless belt conveyor device is to be produced. Furthermore, since they are relatively complex they are subject to malfunctioning and operational failure.

Thus, it is desirable to provide a belt alignment system which is inexpensive, relatively foolproof and reliable, particularly for use with belt conveyors which must of necessity be manufactured at low cost and must be highly reliable.

SUMMARY OF A PREFERRED EMBODIMENT OF THE INVENTION

In accordance with a preferred embodiment of the present invention, a pair of belt position sensing levers having belt sensing devices at the extremities thereof are rotated in opposite directions in response to belt creepage along the longitudinal axis of the roller. A centrally positioned roller adjusting lever is mechanically coupled to both of the belt position sensing levers and is tipped in response to rotation of the belt position sensing levers, which action in turn causes the longitudinal axis of the roller to be tilted in a direction to force the belt back into a realigned position with respect to its direction of motion. The relatively light forces applied by the shifting belt to the belt sensors are considerably amplified by the lever arrangement.

Other objects, features and advantages of the present invention will become apparent upon the perusal of the following specification taken in conjunction with the drawings in which:

FIG. 1 illustrates a top view of the preferred alignment system;

FIG. 2 discloses a side view of the system;

FIGS. 3 and 4 disclose details of the belt sensors and the coupling member positioned between the roller adjusting lever and the belt position sensing levers respectively; and FIG. 5 illustrates a partial front view of the device.

DESCRIPTION OF THE PREFERRED EMBODIMENT

Figure 5:
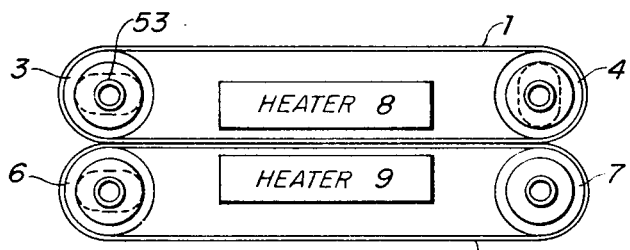

In FIG. 5, a pair of endless belts 1 and 2 are supported by rollers 3, 4, 6 and 7 and are driven by a roller drive mechanism not disclosed. Belts 1 and 2 are maintained in tension by the rollers. Where the belt alignment system is utilized in a laminating machine, heaters 8 and 9 are positioned adjacent the interfaced portions of the belts to heat a card being laminated as it passes through the laminating machine.

Figure 1:
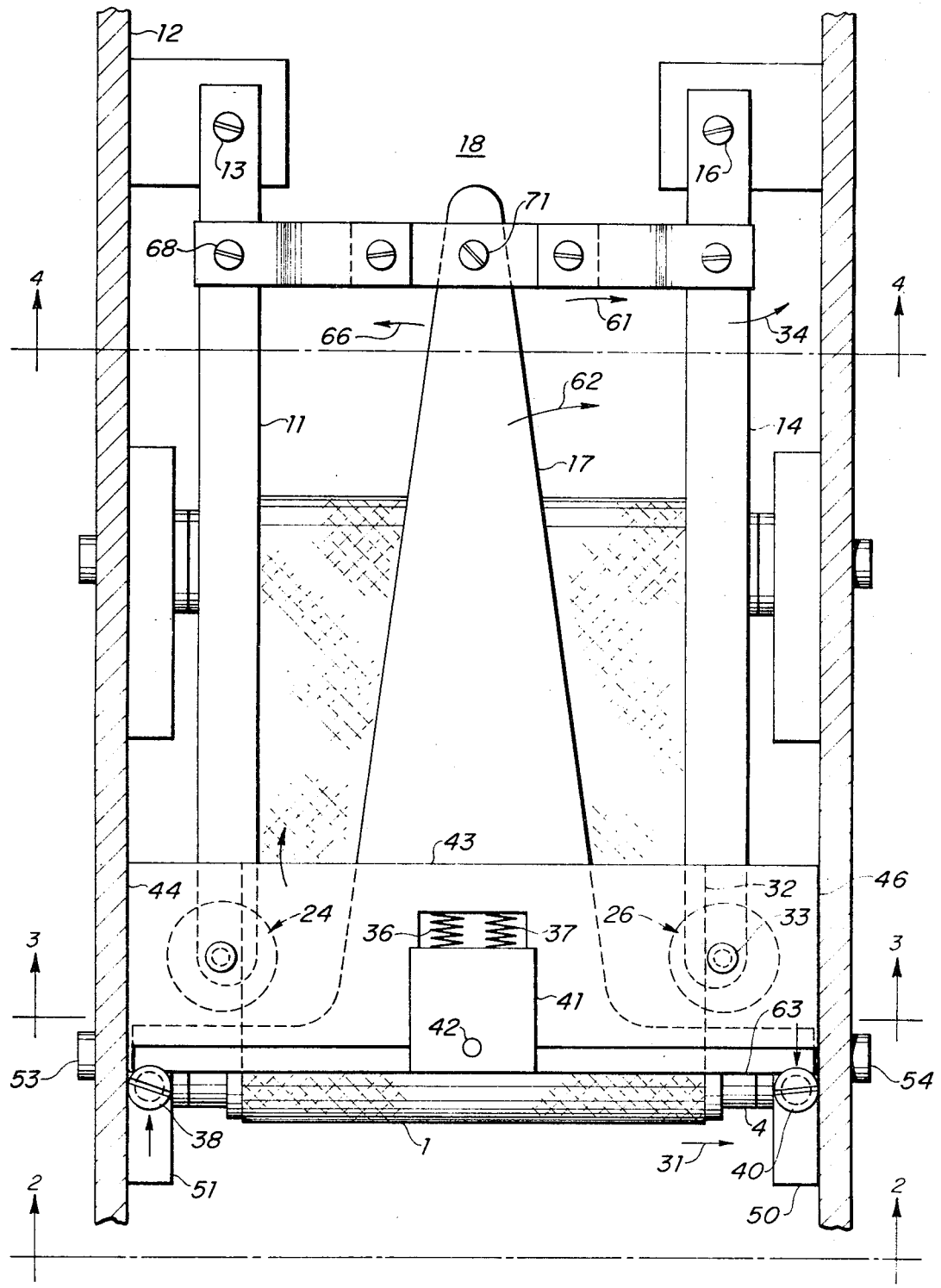
Figure 3:
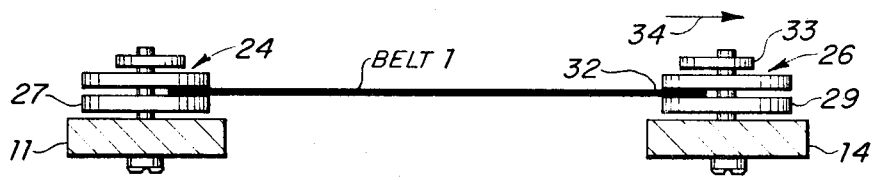
Figure 4:
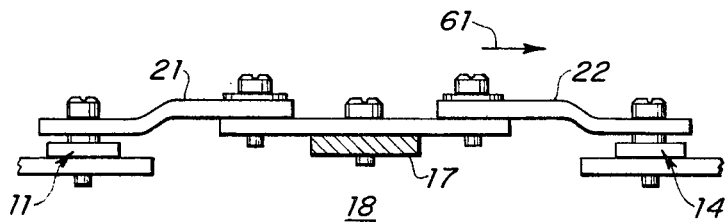

FIG. 1 illustrates a top view of the preferred embodiment. A first belt position sensing lever 11 is rotatably coupled to the frame of the machine 12 by pin 13. Likewise, a second belt position sensing lever 14 is pivotably coupled to machine frame 12 by pin 16. Roller adjusting lever 17 is mechanically coupled to sensing levers 11 and 14 by means of a coupling member or linkage 18, a side view of which is illustrated in FIG. 4. In FIG. 4, lever 11 is pivotably coupled to a first intermediate link 21, while lever 14 is pivotably coupled to roller adjusting lever 17 via a second intermediate link 22. The belt sensing portions of sensing levers 11 and 14 are illustrated in FIG. 3 and include a pair of belt position sensors 24 and 26 which consist of rotatable pullies having indented portions 27 and 29 formed therein. Portions 27 and 29 could be merely shallow grooves formed in the periphery of the pullies or could actually extend a considerably distance into the interior of the pullies as shown in the FIGURE. These pullies are illustrated at the upper portion of FIG. 2 and encompass and contain opposite edges of the belt as illustrated.

Figure 2:
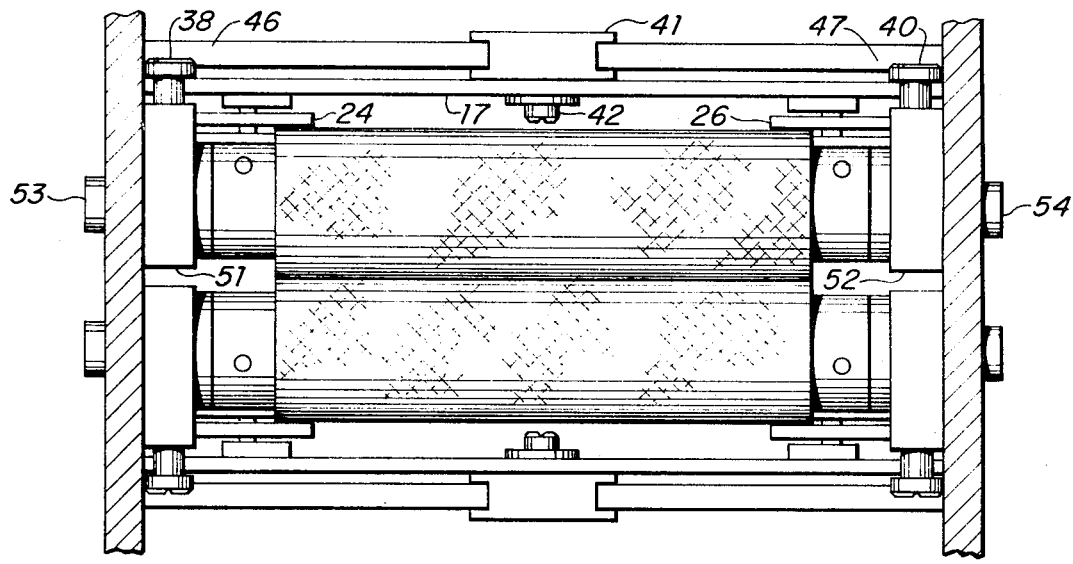

In the centralized or fully aligned position, roller adjusting lever 17 is spring-loaded by springs 36 and 37 against stop members 38 and 40 as indicated in FIGS. 1 and 2. This occurs because block member 41 is pivotably attached to the lower portion of roller adjusting lever 17 by pin 42. Plate member 43 is rigidly coupled to the machine frame wall members at 44 and 46 and thus the reaction forces of springs 36 and 37 pushing against block 41 are transmitted by lever 17 to stop members 38 and 40. The point of contact is best indicated in FIG. 2 at stem portions 46 and 47 of the stop members. The stop members could merely consist of machine screws which screw into floating block members 51 and 52 as illustrated in FIGS. 1 and 2. The floating block members have stud portions 53 and 54 which pass through elongated slots formed in the abovementioned wall members. In the equilibrium position illustrated in FIG. 1 the floating blocks assume a given centralized position with respect to the elongated slots because the spring forces applied by springs 36 and 37 are counterbalanced primarily by the tensile forces produced by the taut belt.

Let it be assumed that the belt is perfectly aligned and its direction of motion is perpendicular to the longitudinal axis of roller 1 of FIG. 1. Roller adjusting lever 17 is in a centralized position as shown in FIG. 1, and belt sensing levers 11 and 14 are parallel to one another as indicated. Now let it be assumed that belt 1 commences to creep to the right in the direction indicated by arrow 31. The right hand belt edge portion 32 pushes against the sensing pulley spindle element 33 illustrated in FIGS. 1 and 3. This action will cause belt position sensing lever 14 to rotate slightly counterclockwise as indicated by the arrow 34 shown in FIGS.

1 and 3. It is estimated that this force is quite small and is in the neighborhood of a few ounces in our machine. The counterclockwise angular rotation indicated by arrow 34 causes the coupling linkage 18 to move to the right as indicated by arrow 61, which in turn causes roller adjusting lever 17 to tilt slightly clockwise as indicated by arrow 62. The lower portion of the roller adjusting lever consists of a "T-head" and rotates with respect to block 41 due to pin 42. This action in turn causes the right hand portion of the "T-head" indicated at 63 to push harder against stop member 40 to cause floating block 52 to slightly shift in a downward direction in FIG. 1. Since belt 1 is not highly elastic, this action causes an increase in the stresses set up within the right hand portion of the belt, which in turn causes the belt to now creep back along the longitudinal axis of roller 1 toward the center of the roller. Additionally, floating block 52 will be pulled by the belt back to its initial position. The system is symmetrical so that a shift of belt 1 toward the left will cause belt sensing lever 11 to rotate slightly clockwise which in turn causes roller adjusting lever 17 to be tipped in the opposite direction as described hereinabove and as indicated by arrow 66. This action causes floating block 51 rather than floating block 52 to move downward and the left hand side of the belt rather than the right hand side of the belt is placed in considerable tension to again cause the belt to creep back toward the center or fully aligned position.

An important feature of the present invention involves considerable magnification of the relatively small forces applied by the edges of the shifting belt to the belt sensors. These forces applied to the belt sensors are, in the present machine, magnified seven times before being applied to the centralized roller adjusting lever 17 due to the fact that the ratio of the distance between the belt sensors 24 and 26 and the lever support means 13 and 16 to the distance between lever support means 13 and 16 and the coupling member 18 is seven. It should also be appreciated that roller adjusting lever 17 also magnifies the forces applied thereto by the coupling member 18 and which are thereafter transmitted to the aforementioned stop members 38 and 40 which are utilized to translate or slightly shift the position of floating blocks 51 and 52 as described hereinabove. The latter-mentioned mechanical advantage is approximately two since the distance between pivotable pin 71 and pin 52 is roughly twice the distance between pivotable pin 42 and stop members 38 and 40. Thus, the composite magnification of the forces applied to the belt position sensors by the shifting belt is the product of the mechanical advantage of the belt position levers and the roller adjusting lever. In the machine built by the inventors this mechanical advantage is approximately 14 ($7 \times 2$).

Thus, in accordance with the present invention, relatively small forces applied to the belt position sensors by the shifting belt are magnified to a large degree in order to tip the longitudinal axis of the belt roller which in turn generates increased tensile stress within the belt to cause the belt to realign itself with respect to its direction of motion. As a result of the present invention, a relatively simple, reliable, and inexpensive all-mechanical device is provided for the first time to solve this problem. The employment of electrical transducers, control circuits and servo motors has been eliminated.

The entire aforementioned organization may be duplicated as shown at the lower portion of FIG. 2 if a double belt arrangement is desired. The duplicated apparatus will not be described since it is identical with the aforementioned apparatus both in its structure and mode of operation. Obviously, the duplicated structure need not always be employed although this would be preferably in a four-roller double endless belt arrangement disclosed hereinabove. For certain applications the lower endless belt structure may be eliminated and a platen may be utilized in conjunction with the upper endless belt. While the aforementioned push pull sensing lever arrangement is greatly preferred, it may well be that for certain special applications a single sensing lever may be utilized for unilateral correction of belt creepage rather than bilateral creepage discussed hereinabove.

While rollers are preferred as belt support members, it is also possible to employ curved platens, sprocket wheels or other turn about devices in their place.

While rotatable pullies are preferred as belt sensors, it would be possible to merely form a groove or provide any contact member at the terminal portions of the belt position sensing levers for transmitting forces to the roller adjusting lever. The term belt sensor thus encompasses any portion of the belt sensing levers, with or without a contact device, which coacts with the belt edge portions.

Obviously, many modifications and variations of the present invention are possible in the light of the above teachings. It is therefore to be understood, that within the scope of the appended claims, the invention may be practiced otherwise than as specifically described.

We claim:

1. In a transport system having a transport belt wrapped about a belt support member, said belt support member having a longitudinal axis associated therewith;

a first belt position sensing lever having sensing means associated therewith for sensing a shift in the lateral position of said belt away from the center of said belt support member and along the longitudinal axis thereof;

a first lever support means for supporting said first sensing lever;

mechanical belt support member adjusting means, mechanically coupled to said first sensing lever by means of a coupling member for tilting the longitudinal axis of said belt support member in a direction to cause said belt to shift toward the center of said belt support member and along the longitudinal axis thereof to maintain said belt aligned with respect to its direction of motion.

2. The combination as set forth in claim 1 wherein the ratio of the distance along said first sensing lever between said sensing means for sensing the position of said belt and said lever support means to the distance along said first lever between said lever support means and said coupling member is greater than two and said belt is substantially non-stretchable.

3. The combination as set forth in claim 2 wherein said ratio is about 7.

4. The combination as set forth in claim 2 wherein said mechanical belt support member adjusting means includes a belt support member adjusting lever coupled between said first sensing lever and said belt support member for tilting the longitudinal axis of said belt support member and for increasing the mechanical advantage of forces applied to said roller adjusting lever by said first belt position sensing lever.

5. The combination as set forth in claim 4 wherein said belt sensing means includes a pulley rotatably coupled to said first sensing lever, said pulley having a cutout therein for sensing the position of an edge of said belt.

6. In a transport system including a machine frame and a transport belt supported by an elongated belt support member having a longitudinal axis associated therewith;
- a first belt position sensing lever having sensing means associated therewith for sensing the lateral position of a first edge portion of said belt along the longitudinal axis of said belt support member;
- a first lever support means for supporting said first sensing lever;
- a second belt position sensing lever having sensing means associated therewith for sensing the lateral position of a second edge portion of said belt opposite said first edge of said belt along the longitudinal axis of said first belt support member;
- a second lever support means for supporting said second sensing lever;
- mechanical belt support member adjusting means mechanically coupled to said first and second sensing levers, through a coupling member, for tilting the longitudinal axis of said belt support member in a direction to cause said belt to shift along said longitudinal axis of said belt support member toward the center thereof to maintain said belt aligned with respect to its direction of motion.

7. The combination as set forth in claim 6 wherein said belt sensing means comprise rotatable pullies mounted upon said first and second belt position sensing levers, said rotatable pullies having indented portions formed therein for encompassing the edges of said belt.

8. The combination as set forth in claim 6 wherein the ratio of the distance along said first and second sensing levers between said belt sensing means and said lever support means to the distance along said levers between said lever support means and said coupling member coupled thereto is greater than two.

9. The combination as set forth in claim 8 wherein said ratio is about seven.

10. The combination as set forth in claim 8 further including a pair of floating blocks slidably coupled to said machine frame;
- means for coupling said belt support member to said floating blocks; and
- means for coupling adjusting belt support member adjusting means to said floating blocks to cause said blocks to be translated with respect to said machine frame upon actuation of said mechanical belt support member adjusting means by said belt position sensing levers.

11. The combination as set forth in claim 8 wherein said transport belt is substantially non-elastic.

12. In a transport system having a transport belt wrapped about a first and second roller, each of said rollers having a longitudinal axis associated therewith;
- a machine frame;
- a first belt position sensing lever having sensing means associated therewith for sensing the lateral position of a first edge portion of said belt along the longitudinal axis of said first roller;
- a first lever support means for supporting said first sensing lever;
- a second belt position sensing lever having sensing means associated therewith for sensing the lateral position of a second edge portion of said belt, opposite said first edge, along the longitudinal axis of said first roller;
- second lever support means for supporting said second sensing lever;
- a mechanical roller adjusting lever coupled to said first and second sensing levers through a coupling member, said roller adjusting lever having an elongated portion for increasing the mechanical advantage of forces applied thereto by said coupling member to facilitate tipping of the longitudinal axis of said first roller.

13. The combination as set forth in claim 12 wherein said first and second lever support means and said coupling member are positioned with respect to said machine frame to cause the forces applied by said belt to said sensing means mounted upon said sensing levers to be magnified before being applied to said roller adjusting lever.

14. The combination as set forth in claim 13 wherein said belt is substantially non-stretchable.

15. In a transport system having a machine frame and a transport belt wrapped about a first and second roller, each of said rollers having a longitudinal axis about which said rollers rotate;
- a first belt position sensing lever having sensing means associated therewith for sensing the lateral position of a first edge of said belt along the longitudinal axis of said first roller;
- a first lever support means for supporting said first sensing lever;
- a second belt position sensing lever having sensing means associated therewith for sensing the lateral position of a second edge of said belt, opposite said first edge, along the longitudinal axis of said first roller;
- second lever support means for supporting said second sensing lever;
- a mechanical roller adjusting lever coupled to said first and second sensing levers through a coupling member, said roller adjusting lever having a first elongated portion extending traverse to the longitudinal axis of said first roller, and a second elongated portion extending parallel to said longitudinal axis;
- a pair of slidable floating blocks coupled to said machine frame, said floating blocks having stop portions associated therewith;
- means for mechanically biasing said second elongated portion of said roller adjusting lever against said stop portions to cause said second elongated portion of said roller adjusting lever to bear against said stops and to translate said floating blocks upon actuation of said mechanical roller adjusting lever.

16. The combination as set forth in claim 15 wherein said first and second lever support means and said coupling member are positioned with respect to said machine frame to cause the forces applied to said sensing means mounted upon said sensing levers to be magnified before being applied to said roller adjusting lever.

17. The combination as set forth in claim 16 wherein the coupling member coupled between said sensing levers and said roller adjusting lever is positioned with respect to the first elongated portion of said roller adjusting lever to cause forces applied to said roller adjusting lever by said coupling member to be again magnified before being applied to said stop portions of said floating blocks.

18. The combination as set forth in claim 17 further including biasing means for spring biasing the second elongated portion of said roller adjusting lever against said stop portions of said floating blocks.

19. The combination as set forth in claim 18 wherein said biasing means further includes a block slidably coupled to said machine frame and pivotably coupled to said roller adjusting lever and spring means for producing reaction forces between said machine frame and the second elongated portion of said roller adjusting lever.

* * * * *